United States Patent
Anstey et al.

(10) Patent No.: US 6,688,092 B2
(45) Date of Patent: Feb. 10, 2004

(54) PICK-UP CROP BAFFLE INCLUDING INTEGRAL CROP HOLD DOWN RODS AND SUSPENSION FOR USE IN WIDELY VARIED CROPS

(75) Inventors: Henry Dennis Anstey, Ottumwa, IA (US); Daniel Eric Derscheid, Ottumwa, IA (US); Darwin Daniel Fish, Ottumwa, IA (US)

(73) Assignee: Deere & Company, Moline, IL (US)

( * ) Notice: Subject to any disclaimer, the term of this patent is extended or adjusted under 35 U.S.C. 154(b) by 66 days.

(21) Appl. No.: 10/045,756

(22) Filed: Jan. 14, 2002

(65) Prior Publication Data
US 2003/0131575 A1 Jul. 17, 2003

(51) Int. Cl.[7] .............................................. A01D 57/00
(52) U.S. Cl. .................................... 56/220; 56/DIG. 21
(58) Field of Search ................................ 56/12.4, 12.5, 56/219–225, 364, 378, DIG. 21

(56) References Cited

U.S. PATENT DOCUMENTS

| | | | |
|---|---|---|---|
| 2,513,430 A | * 7/1950 | Scheid | 56/364 |
| 2,682,743 A | 7/1954 | Hintz | 56/364 |
| 3,599,412 A | * 8/1971 | Lefeuvre et al. | 56/225 |
| 3,747,313 A | 7/1973 | Denzin | 56/364 |
| 3,924,391 A | * 12/1975 | Cheatum | 56/364 |
| 3,978,545 A | * 9/1976 | Morel | 15/83 |
| 4,015,410 A | 4/1977 | Smith | 56/364 |
| 4,411,127 A | 10/1983 | Diederich, Jr. et al. | 56/364 |
| 4,539,798 A | * 9/1985 | Klinner | 56/16.4 R |
| 6,295,797 B1 | * 10/2001 | Naaktgeboren et al. | 56/364 |

* cited by examiner

Primary Examiner—Robert E. Pezzuto
Assistant Examiner—Alicia Torres

(57) ABSTRACT

A baler is equipped with a pick-up for elevating a crop windrow from the ground and delivering it to a rotary conveyor which delivers the crop through an inlet to the baling chamber. Suspended for operation in conjunction with the pick-up so as to aid in achieving continuous, even delivery of crop to the baling chamber is a crop control arrangement including a baffle located in front of the path swept by the pick-up teeth and a plurality of hold down rods which are mounted to the baffle and extend to the rear to the rotary conveyor. The suspension of the baffle allows it to engage the top of a windrow and to flex vertically in a quick, responsive manner both to changes in thickness along the length of and crosswise to the width of the windrow.

18 Claims, 2 Drawing Sheets

PICK-UP CROP BAFFLE INCLUDING INTEGRAL CROP HOLD DOWN RODS AND SUSPENSION FOR USE IN WIDELY VARIED CROPS

FIELD OF THE INVENTION

The present invention relates to pick-ups for windrowed crops and more particularly relates to devices used in conjunction with pick-ups for controlling crop flow.

BACKGROUND OF THE INVENTION

Crop processing implements such as balers and forage harvesters are often provided with a front-mounted pick-ups that are used for lifting a windrow of crop from the ground and delivering it for further processing by the implement. These pick-ups utilize a rotating conveyor provided with a plurality of spring teeth across its width to engage and lift the windrow. One problem attendant with these pick-ups is that when operating to pick up relatively small windrows of light crop, the crop tends to be kicked forward by the rotating teeth until a relatively large amount has accumulated. When this crop finally feeds in, plugging of the implement sometimes results. In attempting to overcome this problem, designers have provided various crop compressors or hold down arrangements.

For example, in U.S. Pat. No. 2,513,430, issued to Scheid on Jul., 4, 1950, there is disclosed a crop compressor arrangement comprising a U-shaped support having its opposite legs pivotally mounted to opposite sides of the pick-up for allowing the frame to pivot vertically, the bight of the frame supporting a plurality of compressor straps spaced across its width. The straps extend down into close proximity of the ground and then are curved up and back to terminal ends located above a tine supporting, pick-up conveyor belt. The compressor bars act to gently press on the crop windrow with the curved portion of the bars acting in conjunction with the spring teeth for preventing the crop in the windrow from being merely pushed forwardly by the teeth. The pivotal mounting of the U-shaped frame allows it to raise and lower in response to the thickness of the windrow.

The known compressor arrangements suffer from the drawbacks of not being suspended for quick response to abrupt changes in windrow thickness both along the length and width of the windrow.

SUMMARY OF THE INVENTION

According to the present invention there is provided an improved crop controlling arrangement for use with a windrow pick-up of a crop processing implement.

An object of the invention is to provide a crop controlling arrangement in the form of a baffle having an optionally usable flexible flap at its lower end that engages the ground so as to serve to effectively prevent light crop from bunching ahead of a windrow pick-up, while maintaining the crop against the tined rotating device of the pick-up.

Another object of the invention is to provide a crop controlling arrangement including a baffle suspended for riding on top of the windrow and/or for being immediately responsive to changes in thickness of the windrow and/or for maintaining an approximate constant spacing between the baffle and pick-up tooth path.

Yet another object of the invention is to provide a crop controlling arrangement having a suspension that is flexible vertically, so as to move in response to side-to-side differences in thickness of windrows, but which exhibits side ways stiffness so as to resist side-to-side-flexure.

Still another object of the invention is to provide a crop controlling arrangement including a baffle, as set forth in one or more of the previous objects, wherein compressor rods are joined to, and spaced transversely across the top of the baffle and extend rearwardly above the pick-up.

These and other objects of the invention will become apparent from a reading of the ensuing description together with the appended drawings.

DESCRIPTION OF THE PREFERRED EMBODIMENT

Figure 1:
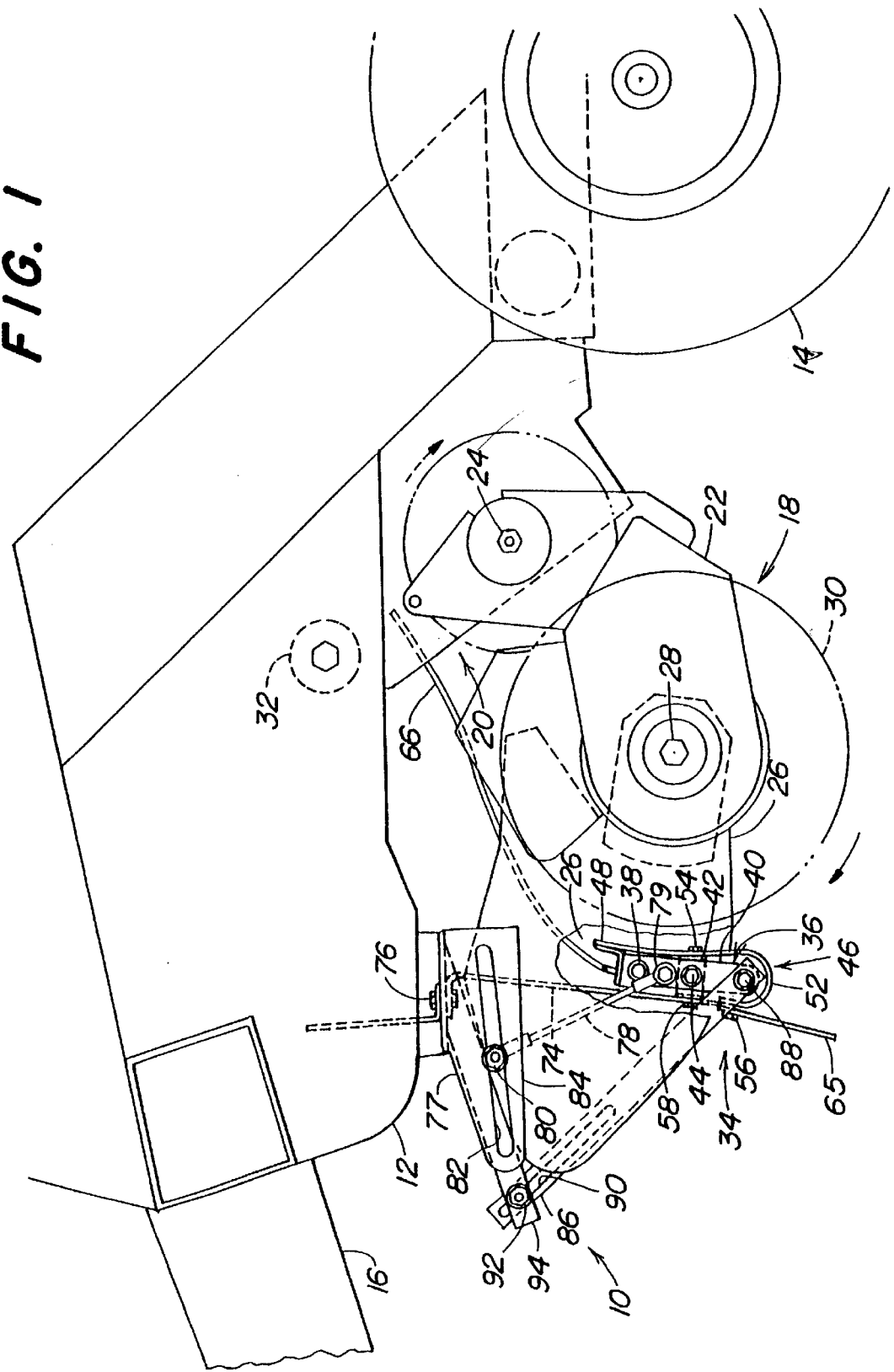
FIG. 1 is a somewhat schematic left side elevational view of a forward end portion of a baler equipped with a pick-up with which a crop controlling arrangement, constructed in accordance with the present invention, is associated.

Referring now to FIG. 1, there is shown a forward end portion of a baler 10 including a main frame 12 supported on ground wheels 14 for being towed over the ground by a tractor that is hitched to a tongue 16 projecting forwardly from the frame 12. Mounted to the frame 12, in front of the wheels 14, is a crop gathering assembly including a pick-up 18 and a rotary conveyor 20. The pick-up 18 is wider than the baling chamber of the baler 10 and includes a frame 22 mounted to the main frame 12 for pivoting about a horizontal transverse axis 24. Flare sheets or crop dividers 26 are mounted to opposite sides of the pick-up frame 22 for pivoting about a horizontal transverse axis 28, with a portion of the divider at the left side of the frame 22 being broken away so as to reveal a portion of the present invention, as will be evident from the following description. Mounted to the frame 22 for rotation about the horizontal transverse axis 28 is a center shaft of a pick-up tine reel or cylinder to which is mounted spiders carrying a plurality of angularly spaced tine bars, not shown, carrying sets of spring tines or teeth that sweep an arcuate path, indicated at 30, as the reel rotates clockwise, whereby the tines act to pick-up a windrow of crop material and deliver it to the rotary conveyor 20.

For the sake of simplicity, the rotary conveyor 20 is shown only in outline. It has its drive shaft located along the pivot axis 24 of the pick-up 18. The rotary conveyor 20 is an overshot conveyor of a known type including centering augers for narrowing the stream of crop material received from the pick-up 18 to the width of a baling chamber inlet. Located between the centering augers is a plurality of transversely spaced flat, rigid tines for delivering the material to the rear through the inlet of the baler 10, which is defined between a bale starter roller 32 and a further roller, not shown, which is spaced below and to the rear of the roller 32.

Figure 2:
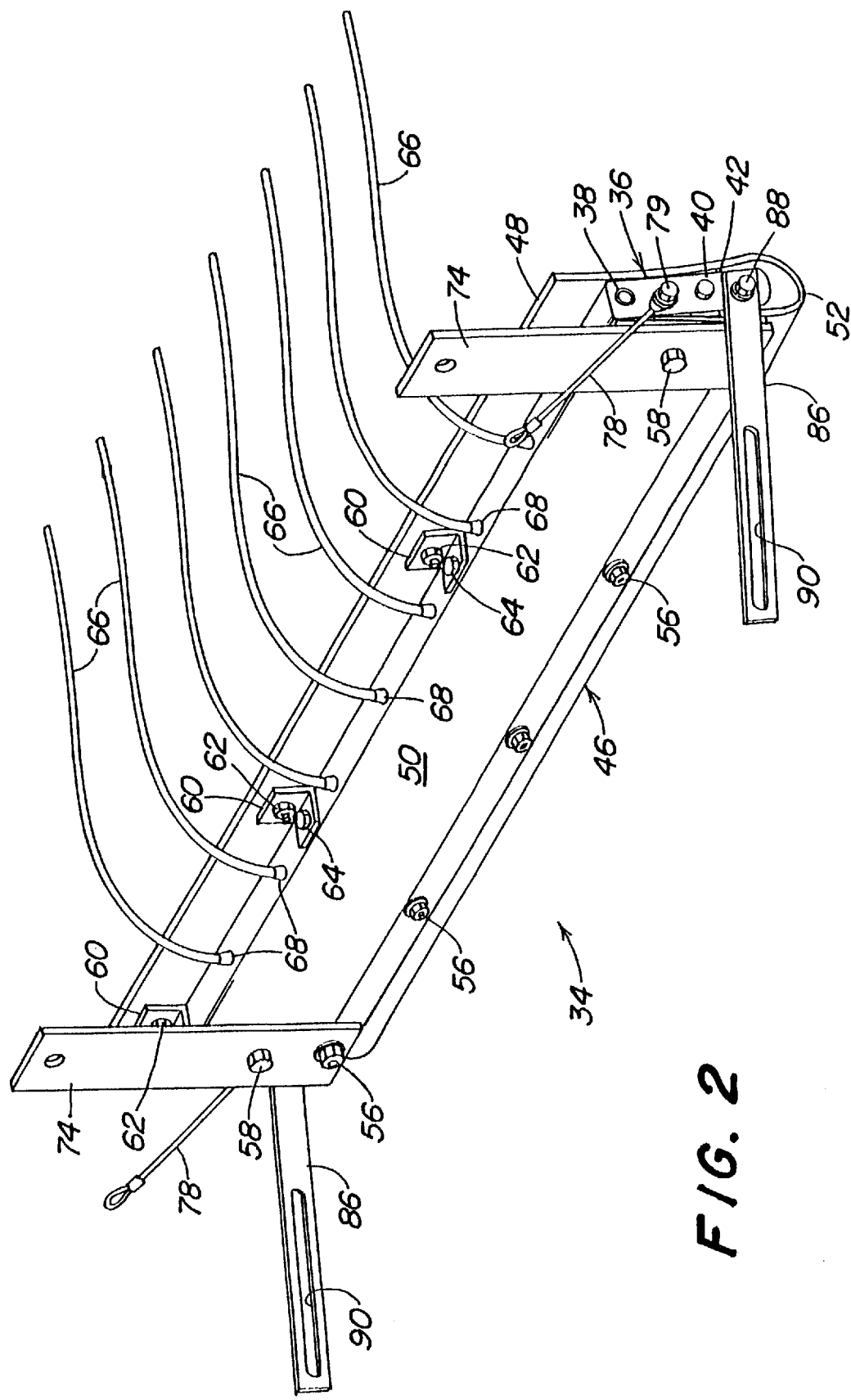
FIG. 2 is a left front perspective view from above of the crop controlling arrangement removed from the baler, but excluding the flexible flap at the bottom of the baffle.

Suspended from the baler main frame 12 in a location forward of the pick-up 18 is a crop controlling arrangement 34. Referring now also to FIG. 2, it can be seen that the crop controlling arrangement 34 includes a generally inverted U-shaped frame 36 including a cross tube 38 joined, as by welding, to upper ends of opposite legs 40. A pair of U-shaped brackets 42 have their legs extending inwardly from bight portions that are respectively fixed, as by a pair of fasteners 44, against inner surfaces of the legs 40 at locations spaced about midway between the cross tube 38 and bottom ends of the legs 40. Mounted to the frame 36 is a crop controlling baffle 46 including a major, somewhat tear drop shaped portion constructed of two rectangular pieces of thin sheet metal, with a first piece 48 being formed so that it is generally J-shaped in cross section, and a second piece 50 (FIG. 2) being of a generally inverted L-shape in cross section. The first piece 48 is arranged such that the hook of the J forms a lower rounded bottom 52, with a rear part of the baffle 46 being formed by the stem of the J and secured to the rear leg of the bracket 42 by a fastener 54. The hook of the J terminates at an upper horizontal transverse edge (not visible) that is located beneath a forward side of the baffle 46 that is defined by the long leg of the second baffle piece 50, the two pieces being connected together by a plurality of transversely spaced screw fasteners 56. Opposite ends of the second baffle piece 50 are respectively secured, as by fasteners 58, to front legs of the brackets 42. The short leg of the second baffle piece 50 extends over the top of the cross tube 38 and terminates at the first baffle piece 48. A plurality of angle or corner brackets 60, shown only in FIG. 2, are spaced transversely across the juncture of the baffle pieces 48 and 50, and a first fastener 62 secures each bracket 60 to the first baffle piece 48, while a second fastener 64 secures each bracket 60 to the short leg of the second baffle piece 50 and to the cross tube 38. Forming a lower section of the baffle 46 is a rectangular flexible flap 65 (shown only in FIG. 1) having an upper marginal portion secured to a lower front location of the tear drop shaped portion of the baffle 46 by the fasteners 56. The flexible flap 65 is used in very light crop having windrows which are thin enough to pass beneath the lower end of the flap, the flap 65 serving to prevent crop from being kicked forward by the pick-up reel teeth. If the flap 65 encounters thicker windrows, it will flex upwardly and in some conditions will become folded around the rounded lower end 52 of the tear drop shaped portion of the baffle 46.

Forming an integral part of the crop control arrangement 34 are a plurality of transversely spaced hold down rods 66 having forward ends extending down through the short leg of the inverted L-shaped baffle piece 50 and through the cross tube 38, with each of the rods 66 having a threaded end exposed below the cross tube 38 and receiving a nut (not shown) which draws a swaged, or otherwise enlarged section 68 (FIG. 2) of the rods tight against baffle piece 50. The hold down rods 66 are each curved upwardly to the rear and terminate at a respective location adjacent the center section of the rotary conveyor 20 that is inward of the centering augers so as to control the flow of crop from the pick-up tines to the conveyor 20. It is here noted that the disposition and shape of the hold down rods 66 is such that loose crop which falls out of the bale-forming belts either passes between the rods 66 or slides down off the front of the rods 66 and then off the front of the baffle 46.

The crop control arrangement 34 includes, and is suspended from the main frame 12 and pick-up 18 by, a suspension arrangement including a plurality of suspension members that cooperate such that the baffle 46 is suspended so as to engage and float upon the top of a windrow of crop and/or the ground. Specifically, fixed to opposite forward sides of the baffle 46 and defining two suspension members are a pair of hangers 74, which are each secured in place by one of the fasteners 56 and one of the fasteners 58. The hangers 74 are constructed of elements that are flexible vertically but resist side-to-side flexure. The hangers 74 are here shown constructed of belt material having upper ends that are each bent forwardly and secured, as by a fastener 76, to a respective downwardly facing surface of a bracket 77 fixed to the baler frame 12. The hangers 74 each have a thickness and width that results in the hangers 74 flexing vertically but being relatively stiff for resisting sideways movement of the baffle 46.

In lieu of the pair of belt hangers 74, a single hanger could be used; or, optionally, lengths of roller chain could be used, for example.

A further pair of flexible elements, here shown in the form of cables 78, define two more suspension members and are respectively located at opposite ends of the baffle 46, with lower rear ends of the cables 78 being defined by eyes that are respective received under washers carried by, and held in place by fasteners 79 respectively secured to the baffle frame legs 40 at locations just below the cross tube 38. Upper front ends of the cables 78 are defined by eyes that are received under washers carried by respective fasteners 80 that are fixed to the flare sheets 26 and positioned for movement along respective fore-and-aft extending slots 82 that are provided in transversely spaced vertical plates 84 that form respective parts of the brackets 77. The usage of the flare sheets 26 as a mounting point for the cables 78 is a matter of convenience since the flare sheets 26 are mounted for pivoting about the axis 28 of the tine reel. However, in pick-up structures where the flare sheets are not pivotally mounted, simple pivoted, rigid links would work just as well. In any event, the cables 78 control the minimum spacing permitted between the baffle 46 and the pick-up tine path 30.

In lieu of the cables 78, rigid lost-motion links having slotted upper ends could be used as suspension members, with the upper end of each of the slots engaging the associated one of the fasteners 80 when the pick-up 18 and baffle 46 are both in the lower extremes of their working ranges, as shown in FIG. 1, the lost motion permitting the baffle to raise and lower relative to the pick-up 18.

The suspension of the baffle 46 is completed by a pair of trailing guide links 86 that are in the form of straps located at the opposite ends of the baffle 46 and having their rear ends pivotally coupled to lower ends of the legs 40 of the frame 36 by a pair of fasteners 88. An elongate guide slot 90 is provided in a forward end section of each of the links 86, and a guide pin 92 is received in each of the guide slots 90 and is secured to a respective mounting arm 94 having a rear portion welded to the underside of the bracket 77, the arm 94 being in the form of a strap that is angled downward and forward from the bracket 77.

In operation, assuming normal crop conditions where the windrow is relatively thick, the baffle 46 of the crop controlling arrangement 34 will be used without the flexible flap 65. Thus, the rounded bottom 52 will be in engagement with the top of a windrow that is being fed into the baler 10 by the pick-up 18 and the rotary conveyor 20. When the windrow is relatively thick, the crop lying on the ground will work alone or together with the baffle 46 to prevent the crop from being kicked forwardly and rolled ahead of the tines. Also, the location of the baffle 46 in closely spaced relationship to the tine path 30 will define a passage for the crop being lifted by the tines, with the baffle 46 acting to keep the crop in contact with the spring tines for positive feeding while at the same time being deflected away from the tines so as to permit thicker sections of windrow to be easily fed.

When the windrows are relatively heavy, but uneven, the baffle 46 will float in response to changing thickness of the windrow both along the length and across the width of the windrow. When one side of the baffle 46 raises, the trailing guide link 86 on that side will shift forwardly along the associated guide pin 92, it being noted that, due to the trailing nature of the links 86, the lifting action of the windrow on the baffle 46 causes it to react quite rapidly to the variation in crop thickness. After the windrow of crop passes through the channel defined between the spring tines and the back side of the baffle 46, the hold down rods 66 will maintain pressure on the stream of crop so that it is fed evenly to the rotary conveyor 20. Further, it is to be noted that the upward movement of the baffle 46 is permitted by the flexible belts 74, but that belts will resist sideways shifting of the baffle 46.

The vertical movement of the pick-up 18 is compensated for by the suspension cables 78 which pivot with the flare sheets 26 and thus are guided along the slots 82, the cables 78 acting to maintain a minimum distance between the baffle 46 and the pick-up tine path 30.

In crop conditions where the windrow being picked up is very light, i.e., relatively thin, the flap 65 will be used. In these conditions, the flap 65 will permit the thin windrow to pass beneath it but will be positioned so as to prevent the crop from being rolled ahead by the pick-up teeth.

It is to be noted that during operation the operator will be able to observe crop feeding in above the top of the baffle 46 as it passes beneath the compressor rods 66. Thus, in the event that a plugging situation does develop, the operator will be able to see this and take appropriate action.

Having described the preferred embodiment, it will become apparent that various modifications can be made without departing from the scope of the invention as defined in the accompanying claims.

What is claimed is:

1. In combination with a crop processing implement including a main frame supported on ground wheels and a crop windrow pick-up coupled to the main frame having tines supported for sweeping a path that carries them into engagement with a crop windrow for elevating the windrow into the implement for further processing, a crop control arrangement comprising: a transverse baffle located ahead of said path for engaging the top of a given windrow being picked up; a flexible suspension arrangement coupled between said baffle and said frame for maintaining said baffle at a substantially constant distance from said path while permitting said baffle to move up and down in response to variations in thickness of said given windrow; trailing guide link arrangement having a rear end pivotally coupled to the baffle; and a lost-motion coupling being established between a forward end of said trailing guide link arrangement and said main frame for guiding said baffle along an upwardly and forwardly inclined path, defined by said lost-motion coupling, in response to variations in thickness of said given windrow.

2. The combination, as defined in claim 1, wherein said guide link arrangement includes a pair of elongate straps respectively located at opposite ends of said baffle and having rear ends pivotally coupled to lower locations of said baffle; and said lost motion coupling including an elongate slot located in an upper section of each strap; and a guide pin received in each slot and fixed to said main frame.

3. The combination, as defined in claim 2, wherein said pick-up includes a reel mounted for rotation about a horizontal transverse axis; and the pivotal connections of the rear ends of said straps of said guide link arrangement being below said horizontal transverse axis, when the baffle is in a free state.

4. The combination, as defined in claim 1, wherein said baffle includes a main frame defined by a cross member and attaching structure at opposite ends of said baffle; and a trailing lost-motion linkage being pivotally coupled between said main frame and said attaching structure.

5. The combination, as defined in claim 4, wherein said crop control arrangement further includes a plurality of transversely spaced, fore-and-aft extending elongate crop hold down members having forward ends attached to said cross member.

6. The combination, as defined in claim 1, wherein said crop control arrangement includes a plurality of transversely spaced, crop hold down elements attached to said baffle and extending upwardly and rearwardly over said pick-up tine path so as to keep crop engaged with the tines, the crop hold down elements being shaped so as to define generally downwardly and forwardly inclined upper surfaces, whereby crop material coming into contact with said surfaces will tend to slide down the hold down elements and onto the ground in front of the baffle.

7. The combination, as defined in claim 1, wherein said flexible suspension arrangement includes at least one element coupled between said baffle and said frame and being constructed so as to flex vertically but not sideways.

8. The combination, as defined in claim 7, wherein said at least one element is in the form of a belt having a width dimension extending transversely so that the belt flexes vertically while resisting sideways movement of said baffle.

9. The combination, as defined in claim 1, wherein said flexible suspension arrangement includes at least two belts respectively coupled between the frame and opposite end locations of said baffle; and said belts each being sufficiently wide, with its width dimension arranged transversely, that the belt may be flexed vertically relatively easily but resists sideways flexure so as to resist sideways movement of said baffle.

10. The combination, as defined in claim 1, wherein said pick-up includes a frame mounted to said main frame for pivoting vertically about a first horizontal transverse axis; a pair of support links projecting forwardly from, and respectively mounted to, opposite ends of said pick-up frame for pivoting vertically about a second horizontal transverse axis spaced forwardly of said first horizontal transverse axis; a guide arrangement associated with and coupling each of said pair of support links to said main frame for constrained fore-and-aft movement in response to up and down pivoting of said pick-up; and said flexible suspension arrangement including a pair of transversely spaced one-way link elements respectively coupled between said baffle and a respective one of the guide arrangements, whereby forward movement of said support links along said guide arrangements is transferred to said baffle thereby maintaining the baffle spaced said approximate constant distance from said path.

11. The combination, as defined in claim 10, wherein said pair of support links are a pair of flare sheets.

12. The combination, as defined in claim 10, wherein said pair of one-way link elements are a pair of elongate flexible elements.

13. The combination, as defined in claim 1, wherein said baffle has a generally rounded lower end.

14. The combination, as defined in claim 1, wherein said baffle includes a flexible lower flap for use in picking up relatively thin windrows of crop, with the flap acting to prevent crop from being kicked forward by the pick-up tines.

15. The combination, as defined in claim 14, wherein said flap is so dimensioned and located relative to a horizontal bottom portion of a remainder of the baffle that the flap does not interfere with the pick-up tines when it flexes back.

16. In combination with a crop processing implement including a main frame supported for movement across the ground, and a crop windrow pick-up coupled to the main frame for relative vertical movement and having tines supported for sweeping a path that carries them into engagement with a crop windrow for elevating the wind row into the implement for further processing, a crop control arrangement, comprising: a transverse baffle having opposite ends and being located ahead of said path for engaging the top of a given windrow being picked up; a suspension arrangement including first and second pairs of suspension members, with said first pair of suspension members being coupled one at each end of said baffle and extending upwardly and forwardly from said baffle and being coupled to said main frame at a respective first location for fore-and-aft guided movement, and with said second pair of suspension members having respective first ends coupled together with a respective one of said first pair of suspension members to said first location of said main frame for fore-and-aft movement, and with said second pair of suspension members each having a second end coupled to said pick-up; said first and second pairs of suspension members being so located relative to said main frame, pick-up and baffle that said baffle is caused to move in response to vertical movement of said pick-up so that a predetermined spacing is maintained between said baffle and said path of the tines.

17. The combination, as defined in claim 16, wherein said second pair of suspension members each being in the form of a rigid link and said first pair of suspension members each being in the form of a flexible element.

18. The combination, as defined in claim 17, wherein said second pair of suspension members are each defined by a flare sheet.

\* \* \* \* \*